Patented Dec. 17, 1929

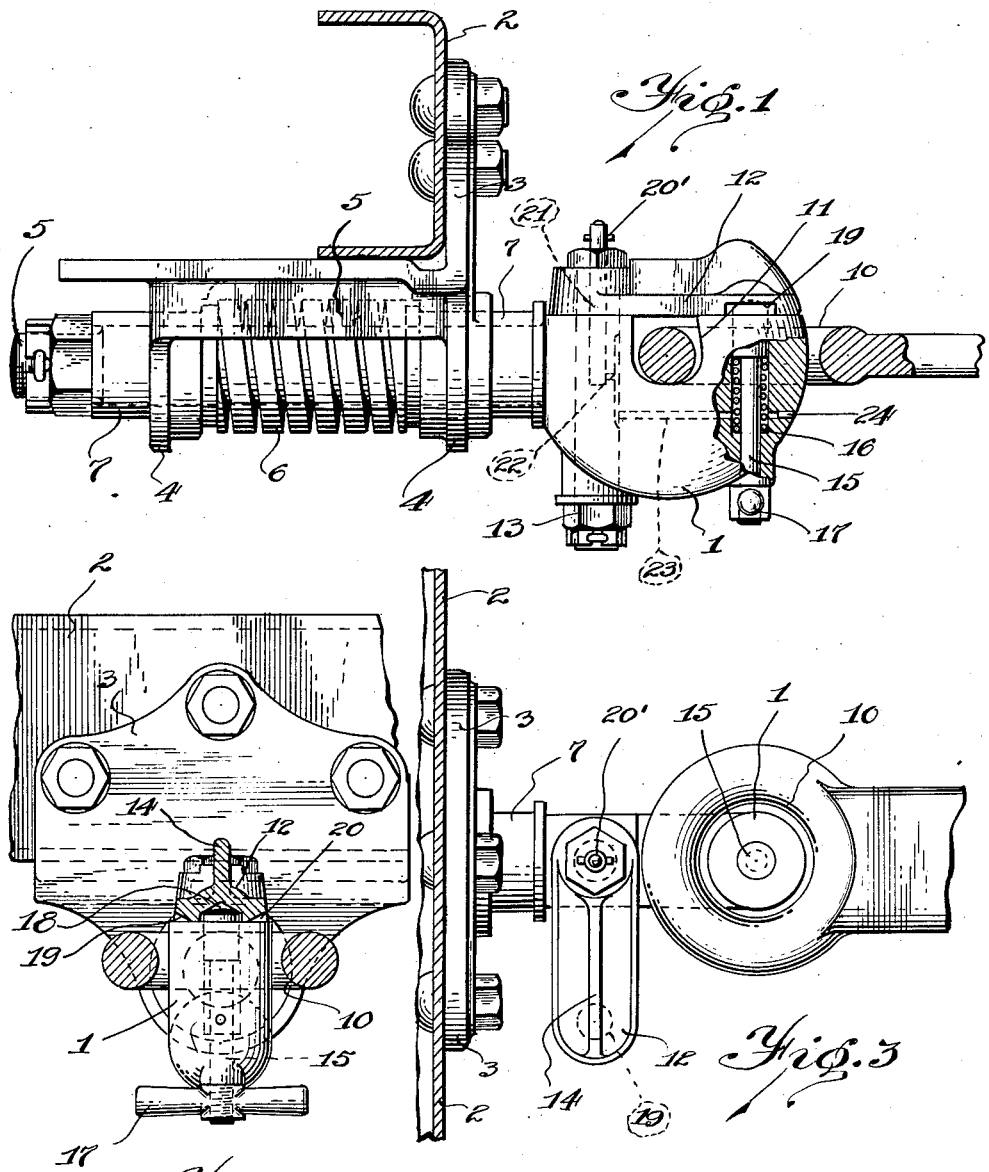

1,739,986

UNITED STATES PATENT OFFICE

FREDERICK MALCOLM REID, OF DETROIT, MICHIGAN, ASSIGNOR TO FRUEHAUF TRAILER COMPANY, OF DETROIT, MICHIGAN, A CORPORATION OF MICHIGAN

PINTLE HOOK

Application filed February 23, 1927. Serial No. 170,204.

This invention lies in a pintle hook which is designed for use as a draft connection between two vehicles such as a tractor and a trailer, or two trailers.

The invention aims to provide a hook which is of simple construction so that the hook is not liable to get out of order or become defective after long use. The hook is constructed in such a way that a loop, ring or other draft connection with which it is connected can turn freely on the hook so as to accommodate for the constantly changing angular position, as between two vehicles. The hook opens upwardly and is provided with a latch which is held in place by a spring actuated locking member, and the arrangement is such that the latch, when open, can be closed, and the locking member automatically snaps to lock the latch.

Another feature of the invention is the arrangement or formation of the hook in such a way that draft strains are confined to the body of the hook and are not permitted to act upon the latch in a degree which would cause a breakage of the latch. The latch is uppermost and sometimes, due to road irregularities or unequal loading of the connected vehicles, the draft strain on the hook is somewhat in an upward direction. The hook is shaped to prevent such upward draft from pulling directly on the latch, but at the same time, this construction does not interfere with the disconnecting of the pintle hook from its associated member by vertical movement of the associated member relative to the hook, regardless of whether the drawn vehicle is pulling back from the drawing vehicle or tending to override the drawing vehicle.

In the drawings:

Fig. 1 is a side elevation of the hook showing the same connected to a vehicle and showing, in section, the cooperating loop or ring.

Fig. 2 is an end elevation of the hook, also showing in section the cooperating loop or ring.

Fig. 3 is a top plan of the hook showing the latch in open position.

In the drawings an upwardly opening pintle hook 1 is shown as connected to the rear of a vehicle frame 2. For the purpose of connecting the hook to the frame, the frame has secured thereto a bracket 3 having depending portions 4. The hook is provided with a rod or bolt 5 which is integral with the hook, or separate, and this bolt extends through the depending portions 4 which are provided with openings for the purpose. A spring 6 encircles the rod between the depending portions 4, and carried by the rod are sleeves 7 which engage opposite ends of the spring. This construction forms a shock absorbing draft connection, in that the spring is compressed by a rearward pull or a forward push on the hook.

A draft member such as a ring or loop 10 is adapted to be received in the hook, and as shown in Fig. 3, the forward portion of the hook which comes into direct engagement with the loop is circular or substantially circular in form. Likewise the ring is substantially circular so that the two members can pivot nicely when the two connecting vehicles are in an angular position.

The rear wall of the ring-receiving part of the hook is inclined from the vertical slightly, as shown at 11. Sometimes, in use, the draft connection 10 pulls upwardly on the hook and the inclination 11 is sufficient to prevent the ring from tending to slide out of the hook whereby the draft strain would be placed upon a latch which closes the hook. However, this inclination is not so abrupt as to prevent one from removing the draft member 10 from the hook should the draft members be under strain with the rear vehicle pulling backwards somewhat on the front vehicle.

A latch member 12 for closing the hook is pivotally mounted on a bolt 13. The latch 12 may be advantageously shaped, as shown in Fig. 2, so that an operating finger piece 14 is provided. A bolt 15 is carried in the body of the hook for locking the latch in closed position. This bolt is spring pressed upwardly by a coil spring 16, and it is provided with a handle or grip 17. As shown in Fig. 2 the latch is formed with a recess 18 into which the upper end of the bolt projects to lock the latch. On opposite sides of this recess the latch is cut away as at 19 and 20.

It will be seen that, to unlock the latch, the bolt is pulled downwardly against the action of the spring by means of the handle 17 whereupon the latch may be turned in either direction upon its pivotal bolt 13. The spring then turns the bolt to its normal locking position and when it is desired to again close the hook, the latch is swung on its pivotal bolt and the upper end of the locking bolt engages the cut-away portion 19 or 20, depending upon which side the latch is swung. These cut-away portions have slanting surfaces which effect a depression of the locking bolt 15, and the bolt snaps into the recess 18 when the latch is properly aligned with the locking bolt.

The pintle hook and its associated draft connection are relatively large and heavy, especially in vehicles designed for heavy duty. Moreover, they are exposed to the elements, and in time often become rusted or otherwise corroded which results in a difficult operation. For the purpose of assuring ease in operating the pintle hook the bolt 13 may be provided with a lubricating fixture 20' which communicates with a channel 21 in the bolt. From this channel 21 leads channels 22 and 23. Lubricant which is forced into the fixture 20 lubricates the latch and its pivotal bolt, and also lubricates the locking bolt 15 by passing through the channel 23. The channel 23 may be closed at its outer end by a plug 24. By proper lubrication, ease in the manual operation of the latch and the locking bolt is assured.

Claims:

1. A pintle hook for connecting vehicles, comprising a hook having an upwardly opening recess, a latch pivotally mounted for movement in a horizontal plane on the upper part of the hook on one side of the recess and adapted to be swung to close said recess, said latch having a recess near its end opposite its pivotal mounting, and a spring pressed plunger in the body of the hook projecting above the same on the opposite side of the hook from where the latch is pivoted adapted to co-operate with said recess to lock the latch in closed postion.

2. A pintle hook for connecting vehicles, comprising a hook having an upwardly opening recess, a latch permanently attached to the hook and pivotally mounted on said hook at one side of the recess for pivotal movement in the horizontal plane, a spring-pressed plunger on the opposite side of the recess normally projecting above the hook, said latch being provided with a recess and having a cutaway portion with a slanting upper surface at one side of the recess, whereby when said latch is closed the spring pressed plunger is automatically depressed by said slanting surface and then snaps into the said recess.

3. A pintle hook for connecting vehicles, comprising a hook having an upwardly opening recess, a latch for closing said recess pivoted on said hook for movement in a horizontal plane, a spring-pressed plunger on the opposite side of said recess and normally projecting above the hook, said latch having a recess and cutaway portions provided with slanting surfaces on each side of the recess, whereby said latch may be closed and the spring-pressed plunger automatically received in said recess by pivotal movement of the latch over the plunger from either side of the plunger.

4. A pintle hook for connecting vehicles, comprising a hook having a recess for receiving a draft member, a pivotally movable latch for closing said recess, a movable plunger on the opposite side of the recess for locking the latch in closed position, lubricating means for lubricating one of said movable members, the said hook having a channel in its body connecting the pivot of the latch and the plunger, whereby lubricant from the one movable member is carried to the other, and all moving parts thus lubricated.

In testimony whereof I affix my signature.

FREDERICK MALCOLM REID.